United States Patent
Kasakewitsch

(10) Patent No.: US 12,258,653 B2
(45) Date of Patent: Mar. 25, 2025

(54) ALUMINIUM MATERIAL AND PROCESS FOR PRODUCING AN ALUMINIUM MATERIAL

(71) Applicant: Alla Kasakewitsch, Neubrandenburg (DE)

(72) Inventor: Alla Kasakewitsch, Neubrandenburg (DE)

(73) Assignee: Alla Kasakewitsch, Neubrandenburg (DE)

( * ) Notice: Subject to any disclaimer, the term of this patent is extended or adjusted under 35 U.S.C. 154(b) by 0 days.

(21) Appl. No.: 18/014,931

(22) PCT Filed: Jul. 5, 2021

(86) PCT No.: PCT/EP2021/068500
§ 371 (c)(1),
(2) Date: Mar. 8, 2023

(87) PCT Pub. No.: WO2022/008435
PCT Pub. Date: Jan. 13, 2022

(65) Prior Publication Data
US 2023/0250512 A1    Aug. 10, 2023

(30) Foreign Application Priority Data
Jul. 6, 2020   (DE) .......................... 102020117761.5

(51) Int. Cl.
*C22C 1/04*   (2023.01)
*C22C 1/051*   (2023.01)
(Continued)

(52) U.S. Cl.
CPC ............ *C22C 1/0416* (2013.01); *C22C 1/051* (2013.01); *C22C 1/1084* (2013.01); *B22F 1/05* (2022.01); *B22F 3/20* (2013.01); *B33Y 10/00* (2014.12)

(58) Field of Classification Search
None
See application file for complete search history.

(56) References Cited

U.S. PATENT DOCUMENTS

2018/0304373 A1   10/2018   Han et al.

FOREIGN PATENT DOCUMENTS

CN   109280818 A   1/2019
CN   110551908 A * 12/2019
(Continued)

OTHER PUBLICATIONS

Ramezani, M., T. Neitzert, Mechanical Milling of Aluminum Powder Using Planetary Ball Milling Process, Journal of Achievements in Materials and Manufacturing Engineering, vol. 55, Issue 2, Dec. 2012 (Year: 2012).*

(Continued)

*Primary Examiner* — Daniel J. Schleis
(74) *Attorney, Agent, or Firm* — Osha Bergman Watanabe & Burton LLP

(57) ABSTRACT

A metal matrix composite produced from a powder mixture including: a composition includes aluminium having a standard of purity of at least 95.0% and including hexagonal boron nitride, and up to 2% of the weight thereof of abherent, and up to 1% of the weight thereof of hexagonal boron nitride. A method for producing a metal matrix composite, which is produced from a powder mixture including: a composition including aluminium having a standard of purity of at least 95.0% and including hexagonal boron nitride, and up to 2% of the weight thereof of abherent, and up to 1% of the weight thereof of hexagonal boron nitride, includes comminuting the aluminium powder mechanically or by water atomisation or gas atomisation, and mixing the material components, in powder form, and processing the mixture, by primary shaping or extrusion or (Continued)

sintering or 3D printing, to form a bar, a semi-finished product, or a component.

8 Claims, 1 Drawing Sheet

(51) Int. Cl.
  *C22C 1/10* (2023.01)
  *B22F 1/05* (2022.01)
  *B22F 3/20* (2006.01)
  *B33Y 10/00* (2015.01)

(56) References Cited

FOREIGN PATENT DOCUMENTS

| | | | |
|---|---|---|---|
| CN | 110592414 | A | 12/2019 |
| DE | 102020000920 | A1 | 8/2021 |
| EP | 3101237 | B1 | 7/2019 |
| WO | 2004026510 | A1 | 4/2004 |
| WO | 2008017111 | A1 | 2/2008 |
| WO | 2008063708 | A2 | 5/2008 |

OTHER PUBLICATIONS

Francis, Lorraine F. Stadler, Bethanie J. H. Roberts, Christine C.. (2016), Materials Processing—A Unified Approach to Processing of Metals, Ceramics and Polymers—5.2.2.3 Grain Growth. (pp. 363). Elsevier. (Year: 2016).*

M. O. Bodunrin et al. "Aluminium matrix hybrid composites: a review of reinforcement philosophies; mechanical, corrosion and tribological characteristics" Journal of Materials Research and Technology, vol. 4, No. 4; 2015 (12 pages).

K. Höll et al. "Long Term Stability of Various Aluminium Graphite Composites" 7th European Advanced Workshop on Micropackaging and Thermal Management; La Rochelle, France; Feb. 2011 (19 pages).

M. Nagaral et al. "Dry Sliding Wear Behavior of Aluminium 6061-SiC-Graphite Particulates Reinforced Hybrid Composites" IOP Conf. Series: Materials Science and Engineering, 310; 2018 (9 pages).

S. Poddar et al. "Analysis of properties of Aluminium-Graphite Metal Matrix Composites" International Journal of Engineering Research & Technology, vol. 2, Issue 11; Nov. 2013 (6 pages).

Search Report issued in German Application No. 102020117761.5; Dated Apr. 28, 2021 (6 pages).

International Search Report issued in International Application No. PCT/EP2021/068500, mailed Oct. 25, 2021 (7 pages).

Written Opinion issued in International Application No. PCT/EP2021/068500; Dated Oct. 25, 2021 (13 pages).

* cited by examiner

ALUMINIUM MATERIAL AND PROCESS FOR PRODUCING AN ALUMINIUM MATERIAL

The invention relates to the technical improvement of a metal matrix composite consisting of a powder mixture having a composition comprising
aluminium having a standard of purity of at least 95.0%, and
hexagonal boron nitride, and
up to 2% of the weight thereof of abherents,
and a method for producing said metal matrix composite.

Metal matrix composites are also referred to by the abbreviation MMC. In the present case, where aluminium is the metal component, it can be referred to as an aluminium matrix composite.

Aluminium matrix composites are generally reinforced by ceramic particles/fibres, or additives such as SiC and/or $Al_2O_3$, carbon modifications, or, depending on the field of application, also by natural and synthetic fibres.

Reinforcements using ceramic additives are known for example from:
https://iopscience.iop.org/article/10.1088/1757-899X/310/1/012156/pdf
or
https://www.sciencedirect.com/science/article/pii/S223878 5415000691

Examples having graphite reinforcements are known for example from:
https://www.ijert.org/research/analysis-of-properties-of-aluminium-graphite-metal-matrix-composites-IJEPTV2IS111061.pdf
or
http://www.imapsfrance.org/thermal/Session%20III/III-1.pdf.

Particle reinforcement of aluminium alloys is generally extremely complex. The production usually takes place by mixing the two components to form a green compact, and simultaneous or subsequent sintering. The aluminium matrix composite is thus shaped to form a bar, semi-finished product, or component. Heat treatment can subsequently take place.

Some of the added particles are questionable from a health perspective, or even carcinogenic.

Aluminium alloys are used not least in the electrical industry as a construction and conductor material. In this case, for example the following aluminium alloys are widely used:

| Alloy | European Standard Designation |
|---|---|
| AlSi1Sn1MgBi | EN AW-6023 |
| AlSi1MqMn-3.2315 | EN AW-6082 |
| Al Mg 1-3.0506 | EN AW-5005 |
| Pure aluminium 99.5E | EN AW-1350A |
| E-AlMgSi0.5 | EN AW-6101B |

Pure aluminium 99.5E (EN AW-1350A, DIN EN 14121) for example has an electrical conductivity of at least 34 mS/m and a thermal conductivity of up to 230 W/(mK), at a state-dependent tensile strength of between 105 and 165 MPa. The comparatively high-strength curable alloy E-AlMgSi0.5 (EN AW-6101B, DIN EN 14121) has an electrical conductivity of approximately 32 mS/m and a thermal conductivity in the region of approximately 218 W/(mK), at a tensile strength of between 170 and 215 MPa. In this case, it should be noted that aluminium alloys have a significantly reduced thermal and electrical conductivity as the strength increases.

On account of their complex production methods and the associated high production costs, aluminium matrix composites are used only rarely.

The use of ceramic dispersoids is known to be an advantageous reinforcement system for metal matrix composites (MMC). SiC, $Al_2O_3$ and also BN are widespread (cubic being more widespread than hexagonal), or complex rare-earth combinations in various configurations. Known forms are fibre, nanoparticle, or nanotube reinforcement systems.

Hexagonal boron nitride (h-BN) has a lattice structure (similar to graphite), and therefore also comparable properties, such as promoting the sliding of lattice planes, which makes h-BN an efficient lubricant. At the same time, on account of the high temperature and corrosion resistance thereof, h-BN is an inert system, and, for this reason too, a suitable reinforcing material for metal matrix composites, specifically not least because property-impairing aging in the form of slow decomposition or dissolution of the dispersoids in the basic matrix is avoided.

The object of the invention is that of creating an aluminium material for electrotechnical applications, which material can be produced in a simplified production method, using components harmless to health, at least at the level of conventional, possibly improved, conductivity, mechanical strength, creep resistance, and/or corrosion resistance.

The above object is achieved by an aluminium matrix composite according to claim 1, and a method for the production thereof according to claim 4. Advantageous embodiments are specified in the dependent claims.

The aluminium matrix composite according to the invention has a composition consisting of aluminium having a standard of purity of more than 95.0%, preferably more than 99.0% (in particular 99.5%), and up to 2 percent by weight of an abherent, in particular metal soap or stearic acid, as well as hexagonal boron nitride (and specifically preferably only these three components)—and, according to the invention, is characterised by a hexagonal boron nitride fraction of just 1 percent by weight.

This material is produced according to the invention in that the aluminium is comminuted by means of water atomisation or gas atomisation or, particularly preferably, mechanically, and mixed with the remaining components, in powder form. The mixture is preferably extruded after the components have been mixed together, as a result of which a tensile strength of up to 350 MPa can be achieved, specifically directly after the extrusion, even without subsequent heat treatment. However, primary shaping methods such as sintering or 3D printing [additive manufacturing] to form a bar, semi-finished product or component are also methods according to the invention for processing the powder mixture according to the invention, and specifically preferably such that (guided, controlled and/or regulated within the method parameters) no melt phase occurs in the process, and in particular the melting point, in particular of the aluminium material, is not exceeded.

The thermal conductivity and the electrical conductivity advantageously result, according to the invention, in the region of the pure aluminium starting component, in particular having a standard of purity of 99.5%.

The aluminium matrix composite according to the invention can have a particularly advantageous combination of electrical conductivity, strength, corrosion resistance, and creep resistance. The addition of up to 1% boron nitride makes it possible to increase the strength, for example from approximately 80 MPa to up to approximately 350 MPa. In addition to the electrical conductivity, the corrosion resistance of the compound according to the invention is not impaired, as in the composites of the prior art, but rather both properties remain at the level of aluminium at a standard of purity of 99.5%.

Shifting movements are impaired or even prevented by the addition of the boron nitride, as a result of which the creep resistance of the compound according to the invention even increases with respect to Al 99.5.

For producing, and in the process in particular also already shaping, the aluminium matrix composite according to the invention, extrusion, which in particular already concludes the production process, is particularly preferred. For the most common extruded aluminium matrix composites, a reshaping temperature of at least 450° C. is required. Typically subsequent heat treatment takes place for complete consolidation of the compound. A significantly lower shaping temperature is sufficient for shaping the aluminium composite according to the invention (said lower temperature in particular being such that the melting point is not, or is only slightly, exceeded), in order to be able to achieve an almost one hundred percent final density and final strength. Subsequent heat treatment is not required.

Pure aluminium, preferably of 99.5% purity, and in particular also otherwise exclusively physiologically harmless materials, are used for producing the aluminium composite according to the invention.

Recycling of the finished aluminium composite according to the invention, which is possible without problem, is a further significant advantage, as well as the use, possible according to the invention, of recycled aluminium, and in this case in particular the mechanical comminution of pure aluminium granulate to Al powder for the mixture according to the invention. This is because the invention achieves sustainable use of raw materials, resource efficiency, and environmental friendliness. Since the composite consists of in particular up to 99.95% pure aluminium (possible purity of the Al powder component according to the invention), it can extremely advantageously be returned into the recycling and secondary market without loss of quality.

The aluminium composite according to the invention, having a strength that is in particular three times greater than that of conventional "E-aluminium", and having its improved corrosion and creep resistance, is particularly advantageously suitable for electrotechnical applications.

The following compositions, given by way of example, have proven themselves as a mixture (in particular just these three components), in particular for subsequent, and in particular also final, extrusion:

mechanically ground aluminium powder having a purity of over 95%, preferably over 99%, particularly preferably over 99.5%, in particular 99.7%, in jagged grain shape and surface, having average grain diameters of at most 500 μm, preferably at most 100 μm, particularly preferably at most 50 μm, in particular 25 to 40 μm;

hexagonal boron nitride powder of at most 1%, preferably at most 0.5%, particularly preferably at most 0.1%, in particular 0.05%, of the weight of the composition having a purity of at least 95%, preferably at least 97%, particularly preferably at least 98%, in particular 98.5%, at an average particle size of at most 50 μm, preferably at most 10 μm, particularly preferably at most 5 μm, in particular 2 μm; and abherent powder, preferably metal soap or stearic acid, and specifically most 2%, preferably at most 1.5%, particularly preferably at most 1%, in particular 0.5%.

The solidification process according to the invention (providing the soft basic material with increased strength) is based on what is known as dispersion hardening.

Dispersoids (particles) are distributed as homogeneously as possible in the relevant matrix material (in this aim substantially dependent on process parameters), such that an in particular uniform spacing is formed between the individual particles. The smaller the spacing between the individual dispersoids, the more efficient the effect of the relevant microscopic distortion field of a dispersoid, in the overall composite, on the macroscopic material strength. The correlation can be calculated using what is known as the Orowan mechanism, which describes how shifting movements (macroscopically—the fewer the shifting movements, the stronger the material) in the distortion field of obstacles (here the dispersoids) are secured or at least significantly impeded. The minimal dispersoid spacing results over the spread of the distortion field, which the dispersoid (the more similar the structure of the dispersoid is to the matrix material, the more effective) can project into the encasing matrix material.

Firstly, hexagonal boron nitride (h-BN) offers an excellent connection to the host lattice of Al, as a result of which shifting movements are obstructed particularly efficiently. Furthermore, h-BN decomposes during the mechanical comminution, in particular the grinding, to the individual slip planes thereof, such that at the end of the process the dispersoids are only a few nanometres in size. This has an effective impact on pure aluminium, as a result of which, specifically, high levels of solidification can be achieved, even at very small amounts of h-BN (for example 0.05 to 0.99 wt. %). This is a significant difference compared with other dispersoids (for example SiC, $Al_2O_3$, or cubic BN) which typically have to make up a fraction of from 5 to 40 wt. % of the material. On account of the small size and shape of the individual h-BN slip planes, the lattice distortions have only a comparatively small impact on phonon and electron movements. Thus, physical properties such as electrical and thermal conductivity of the starting material are largely or completely retained. Furthermore, the h-BN dispersoids, which cannot be cut by shifting, prevent grain growth. A further effect of the impeded shifting movements is that of impeding the deformation in the microstructure, which is advantageously displayed as creep resistance.

Of the mentioned process parameters, for example the following is particularly preferred:

For a homogeneous distribution, the particles should be agglomerated (adhering to one another) as little as possible, and must be present as uniformly as possible in the macro-mixture (the starting material in powder form).

Subsequently, the particles (the h-BN) are "incorporated" into the Al matrix material (i.e. when preparing the mixture of h-BN powder and Al powder). In this case, too, the matrix material should adhere as little as possible, since otherwise the particles cannot penetrate into the matrix.

In the prior art, composites are mechanically alloyed using the highest possible amount of energy. In contrast, in the process according to the invention the energy is particularly preferably kept so low, during the mechanical alloying, that matrix components are not further ground, comminuted or smudged; in this way, the particles are simply "softly" encased or incorporated in the matrix material.

A composition of the powder mixture according to the invention is also for example:

water-atomised or gas-atomised aluminium powder having a purity of over 95%, preferably over 99%, particularly preferably over 99.5%, in particular 99.7%, in spherical grain shape and having a smooth surface, having average grain diameters of at most 500 µm, preferably at most 100 µm, particularly preferably at most 50 µm, in particular 25 to 40 µm;

hexagonal boron nitride powder of at most 1%, preferably at most 0.5%, particularly preferably at most 0.1%, in particular 0.05%, of the weight of the composition having a purity of at least 95%, preferably at least 97%, particularly preferably at least 98%, in particular 98.5%, at an average particle size of at most 50 µm, preferably at most 10 µm, particularly preferably at most 5 µm, in particular 2 µm; and abherent powder metal soap, and specifically at most 2%, preferably at most 1.5%, particularly preferably at most 1%, in particular 0.5%.

The standard of purity of the Al starting material substantially influences the physical properties: the greater the purity, the better the physical and chemical properties, but also the more expensive the material. Therefore the restriction to pure aluminium according to 1xx DIN EN 1780-1 or 1xxx DIN EN 573-3.4 is advantageous.

Industrial-scale application of the invention is also possible, in the material grinding technology, and processing of the powder mixture, according to the invention.

Thus, for example the powder extrusion process is also a development, but nonetheless possible and advantageous according to the invention, compared with the known extrusion, for reshaping of solid material.

The atomised spherical Al powder is suitable for industrial-scale application, but is relatively expensive and has a high level of shape quality which is not necessarily required. It has been found, according to the invention, that although the highest possible purity of the matrix powder is particularly advantageous, the grain shape plays a lesser role. This means that the laboriously and resource-intensively prepared water-atomised or gas-atomised powder (approx. 30 €/kg) can be dispensed with in favour of simpler mechanically comminuted powder (approx. 2 to 3 €/kg). The material can be taken directly out of the processing circuit for pure electro aluminium. This approach firstly allows for an economical and resource-saving end product, and in addition the raw material supply is significantly more reliable, even at a large scale. Al granulates having a grain size of from approximately 1 to 5 mm are a standard product of the processing industry. The omission of an energy-intensive remelting process, possible according to the invention, generates additional savings effects.

h-BN and abherent, in particular metal soap powder, are also materials which can be obtained cheaply in large quantities.

The preparation of the powder, according to the invention, may comprise the process steps of comminution, mixing, mechanical alloying, and deagglomeration.

The process steps of mixing can take place as follows, for example in a planetary mill, in particular around the step of mechanical alloying.

According to the invention, the grinding and mixing procedures can particularly preferably take place in two steps following a preliminary process of comminuting the Al granulate:

In the preliminary process, the Al powder is mechanically comminuted from, for example, an average grain diameter of 1 mm to 5 mm, to between 25 µm and 40 µm.

The filling of the mill consists for example of slightly less than one third powder and slightly more than two thirds grinding beads:

1. Possible deagglomeration and homogenisation of Al and abherent powder,

The introduced grinding energy is preferably set, by setting the temperature, duration and speed, such that powder agglomerations are reliably dispersed, without smudging material.

2. Mechanical alloying: High-energy transformation, with addition of the h-BN powder, The energy introduced is preferably set, by setting the temperature, duration and speed, such that the h-BN particles are pushed into the larger Al particles (mill shaping, mechanical alloying).

3. Deagglomeration

A possible further deagglomeration step, which further homogenises the powder mixture.

The deagglomeration, taking place at lower speeds (at a lower introduced energy), then distributes in particular production-related and storage-related accumulations of Al and h-BN uniformly in the mixture.

This is followed by the incorporation of the h-BN, the mechanical alloying: In addition to further comminution of all the h-BN particles, specifically the fragmentation thereof by sliding of the lattice planes (such as in the case of smudging using graphite-like the function of a pencil, where in each case only the uppermost atom layers are removed when writing), the (nanoscale) h-BN is moulded into the surface of the Al matrix particles. During this, the Al matrix particles can undergo further deformations and diameter reductions. Thus, finally, a homogeneous mixture of the Al matrix and of the h-BN dispersoid can be achieved. This state can be predicted by means of calculation as Orowan particles (the system applies exclusively in the encasing mechanism, the ceramic particle itself cannot be cut). An optimal active spacing of the dispersoids, and the size thereof, can be calculated.

For the powder preparation and mixing, planetary mills are particularly suitable as a grinding system, for smaller throughputs. For industrial-scale comminution tasks, eccentric vibrating mills are suitable apparatuses according to the invention.

In the preliminary process already mentioned, Al granulate (a grain size of, for example, from 1 to 5 mm) can be comminuted to a grain size of, for example, approximately 40 µm, in particular in an eccentric vibrating mill.

Regarding the powder processing according to the invention, there are a very large number of shaping methods (in particular for the material which is in particular not porous according to the invention-porous systems would be filters for example). They can in principle be divided into methods comprising a melt phase (for example casting, selective laser melting, powder welding, electron beam welding, deposition welding) or without a melt phase (extrusion (in particular at high temperatures: hot extrusion), sintering processes (hot isostatic pressing-HIP), roll compaction (P/M), powder injection moulding (PIM), spark plasma sintering (SPS), selective laser sintering (SLS), jet printing).

Sintering processes usually consist of a pre-consolidation phase, the sintering process, and post-consolidation for reducing the porosity.

In the case of the extrusion particularly preferred according to the invention, at high temperatures (hot extrusion), the powder compaction takes place in one work step in the receiving vessel, using the plunger. The subsequent thermo-mechanical bonding (friction welding, and bonding of the individual particles of the MMC) can result from the applied pressure in combination with the temperature (particularly preferably below the material melting point) within the matrix and, according to the invention, lead to shaping of a largely pore-free moulding (bar, semi-finished product, or even finished component).

In 3D printing systems (in particular sinter phase systems), the pre-compaction and consolidation can be achieved, according to the invention, by the structure and composition of the print powder and/or a laser-based joining technique (in particular without a melt phase). In this case, possible techniques differ with respect to the work steps thereof. Firstly, pure green compact production approaches exist, which sinter a product separately, only after the shaping; secondly there are production approaches in which the sintering process is initialised locally, by the laser, directly during powder application. The latter process variant has a lower porosity compared with the first, but usually at the cost of higher production requirements and a lower production capacity.

As a particularly suitable powder processing method, according to the invention, the shaping by extrusion at high temperatures offers material throughput rates which are suitable on an industrial scale and are comparable to conventional mass-production methods of the metal industry. Apparatuses for this are designed, according to the invention, in the following manner.

According to the invention, the extrusion, in conventional extrusion systems for solid material shaping, preferably obtains a handling aid for powder systems according to the invention, in order to transfer the consolidation energy, applied by the plunger, to the powder material. Possible methods are for example sintering of the powder material to form an extrusion billet, or the use of powder-filled metal shells based on the powder matrix material (for example Al powder in an Al shell). Both variants seal the cavity side of the receiving vessel (and thus prevent the powder material being blown out through the cavity), and allow for continuous degassing, while the plunger compresses the system and generates the applied pressure for the material shaping. The shell variant can be more flexible compared with the sintered bolt, at a simultaneously lower work outlay and lower costs. The shell system can produce a layer of shell material on the outer shell of the extruded profile, which requires subsequent mechanical treatment.

The shell can for example be formed without weld seams between the base and sides thereof. According to the invention this prevents, for example, the weld seams, which are usually softer than the shell itself, from deforming during the actual extrusion.

Both cover sides may be screwed, and retain the powder in the shell during the extrusion. In this case, a cover hole allows for degassing of the powder.

Using for example a shell system of this kind makes it possible for the processing according to the invention to otherwise correspond to a conventional extrusion process in conventional machines or plants.

For example, in the preheated state, at 350° C.

The following drawings show, in two graphs, properties of the following composition as an embodiment t of the invention, compared with E-aluminium ("E-Al (ref.)") from the prior art:

Mechanically ground aluminium powder having a purity of 99.5%, in jagged grain shape and surface, having average grain diameters of between 25 μm and 40 μm;
<1.0 wt. % hexagonal boron nitride powder;
<2.0 wt. % abherent.

Figure 1:
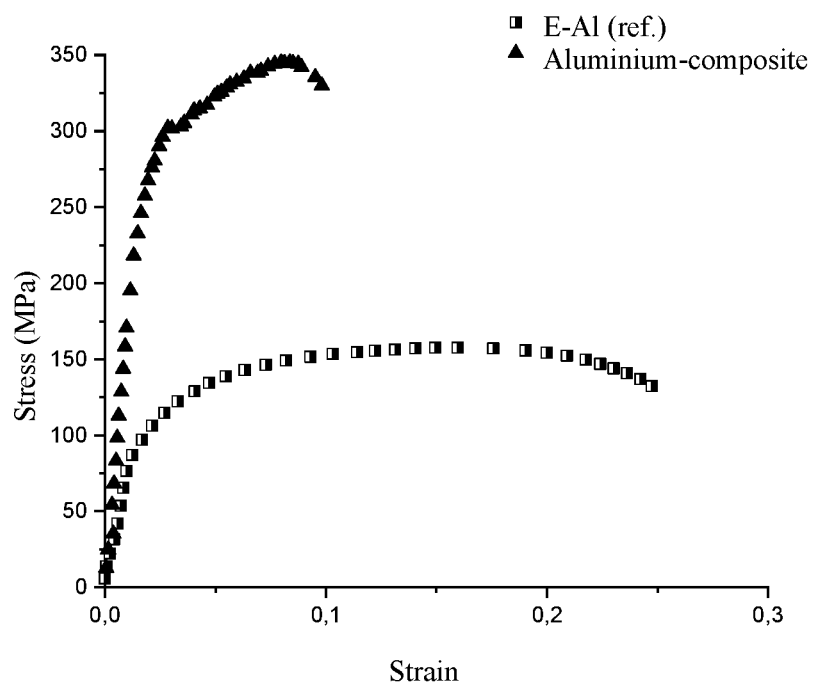
FIG. 1 is a stress/strain graph.

According to FIG. 1, the significantly higher stress curve of the aluminium composite according to the invention, having peak values for the tensile strength in the region of 350 MPa, compared with the known aluminium material (E-Al) having maximum values in the region of approximately 150 MPa, is clear.

Figure 2:
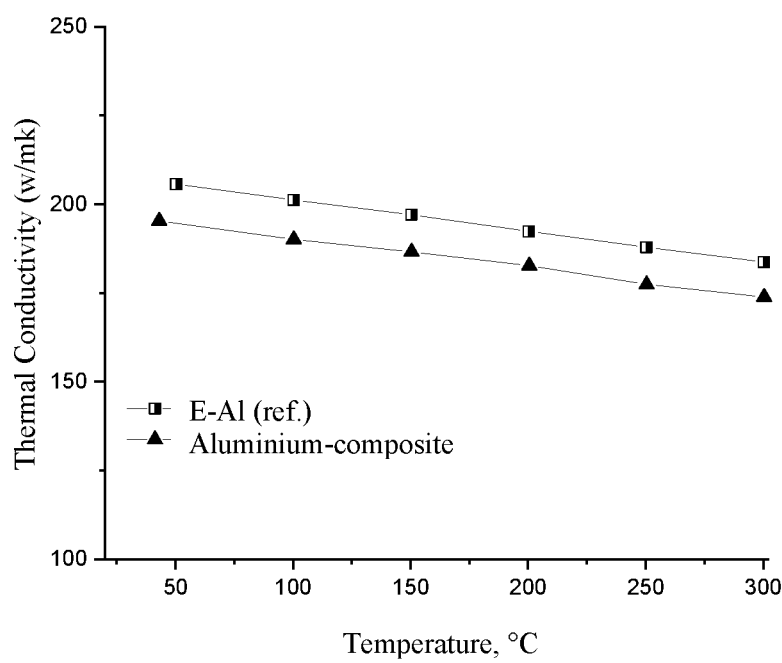
FIG. 2 is a graph showing the thermal conductivity behaviour as a function of the temperature.

FIG. 2 clearly shows the advantages of the aluminium composite according to the invention, because the thermal conductivity (W/mK), and accordingly the electrical conductivity, moves over the relevant temperature range, at the level of known aluminium materials (E-Al).

The invention claimed is:

1. A method for producing a metal matrix composite produced from a powder mixture comprising: a composition comprising aluminium having a standard of purity of at least 95.0%, up to 1% weight of hexagonal boron nitride, and up to 2% weight of abherent, the method comprising:
   comminuting the aluminium powder mechanically, wherein the comminuting comprises mechanically communiting an aluminum starting material having an average grain diameter ranging from 1 mm to 5 mm to the aluminum powder having an average grain diameter of at most 500 μm;
   mixing the material components, in powder form, and
   processing the mixture, by primary shaping or extrusion or sintering or 3D printing, to form a bar, a semi-finished product, or a component.

2. The method according to claim 1, wherein primary shaping or extrusion or sintering or 3D printing is carried out such that the melting point of the aluminium material is not exceeded.

3. The method according to claim 1, wherein the step of mixing the material components in powder form comprises:
   mechanically alloying the aluminium and the boron nitride, and deagglomerating previously and/or subsequently.

4. The method according to claim 3, wherein mechanically alloying the aluminium and the boron nitride, and deagglomerating previously and/or subsequently, take place in the same apparatus, in a grinder, in one work step.

5. The method according to claim 1, wherein mechanically comminuting the aluminium powder, and mixing the material components in powder form, take place in the same apparatus, in a grinder, in one work step.

6. The method according to claim 1, wherein the aluminium powder is mechanically comminuted to a grain size of at most 100 μm.

7. The method according to claim 1, wherein the hexagonal boron nitride powder in the composition
   makes up at most 0.5% of the weight thereof, and/or
   has a purity of at least 95%, and/or
   has an average particle size of at most 50 μm.

8. The method according to claim 1, wherein the abherent in the composition makes up at most 1.5% of the weight thereof.

* * * * *